United States Patent
Leach

(10) Patent No.: US 9,016,737 B2
(45) Date of Patent: Apr. 28, 2015

(54) COMPRESSIVE SENSOR PACKAGING TECHNIQUES

(71) Applicant: Autoliv ASP, Inc., Ogden, UT (US)

(72) Inventor: William M. Leach, West Bloomfield, MI (US)

(73) Assignee: Autoliv ASP, Inc., Ogden, UT (US)

( * ) Notice: Subject to any disclaimer, the term of this patent is extended or adjusted under 35 U.S.C. 154(b) by 0 days.

(21) Appl. No.: 13/828,077

(22) Filed: Mar. 14, 2013

(65) Prior Publication Data

US 2014/0265445 A1 Sep. 18, 2014

(51) Int. Cl.
*B60R 19/22* (2006.01)
*B60R 21/0136* (2006.01)

(52) U.S. Cl.
CPC .................................. *B60R 21/0136* (2013.01)

(58) Field of Classification Search
CPC .... B60R 19/18; B60R 19/48; B60R 21/0136; B60R 21/34
USPC ......... 293/102, 120, 121, 132, 135, 136, 109; 296/187.02, 187.04, 187.09
See application file for complete search history.

(56) References Cited

U.S. PATENT DOCUMENTS

| | | | |
|---|---|---|---|
| 3,494,607 A | | 2/1970 | Rusch |
| 4,808,450 A | * | 2/1989 | Guy .............................. 428/31 |
| 5,106,137 A | * | 4/1992 | Curtis .......................... 293/107 |
| 6,270,130 B1 | * | 8/2001 | Kim .............................. 293/107 |
| 6,561,301 B1 | * | 5/2003 | Hattori et al. ................. 180/274 |
| 6,755,452 B2 | * | 6/2004 | Cate et al. ..................... 293/120 |
| 7,784,817 B2 | * | 8/2010 | Choi et al. ................. 280/728.2 |
| 8,368,523 B2 | * | 2/2013 | Takahashi et al. ............ 340/436 |
| 2002/0121787 A1 | * | 9/2002 | Tarahomi et al. ............. 293/120 |
| 2003/0020289 A1 | * | 1/2003 | Dohrmann et al. ........... 293/107 |
| 2004/0174024 A1 | * | 9/2004 | Murata et al. ................. 293/109 |
| 2009/0267367 A1 | * | 10/2009 | Morikawa et al. ............ 293/132 |
| 2009/0322107 A1 | | 12/2009 | Takahashi et al. |
| 2010/0030433 A1 | * | 2/2010 | Suzuki ............................ 701/45 |
| 2013/0093200 A1 | * | 4/2013 | Tanton ......................... 293/132 |

FOREIGN PATENT DOCUMENTS

| | | |
|---|---|---|
| DE | 10 2005 005 881 A1 | 3/2006 |
| DE | 10 2010 022 686 A1 | 1/2011 |
| JP | 2005-178416 | 7/2005 |
| JP | 2005/178416 A | 7/2005 |

(Continued)

OTHER PUBLICATIONS

International Search Report—May 23, 2014.

*Primary Examiner* — Gregory Blankenship
(74) *Attorney, Agent, or Firm* — Brinks Gilson & Lione

(57) ABSTRACT

A sensor assembly for a motor vehicle adapted for sensing impacts including pedestrian impacts. The sensor assembly includes first and second energy absorbing elements formed of differing materials which couple an applied force to the vehicle to a compressive force acting on a compressive sensor element. The first and second energy absorbers are combined in a manner to tune the response between the applied force and forces acting on the compressive sensor to provide desired response characteristics. The first and second energy absorbers can be configured to produce force flow paths which further aid in response tuning. Another embodiment utilizes an energy absorber having a shaped cross section which focuses and balances impact force is applied to the compressive sensor.

23 Claims, 3 Drawing Sheets

(56) References Cited

FOREIGN PATENT DOCUMENTS

| JP | 2007-237767 | * | 9/2007 | ............ | B60R 19/48 |
| JP | 2007-302060 | * | 11/2007 | ............ | B60R 19/48 |
| JP | 2009-40423 | * | 2/2009 | ............ | B60R 19/18 |
| JP | 2011/245910 | | 5/2010 | | |
| JP | 2010-285142 | * | 12/2010 | ............ | B60R 19/48 |
| JP | 2011-245910 | * | 12/2011 | ............ | B60R 19/48 |

* cited by examiner

COMPRESSIVE SENSOR PACKAGING TECHNIQUES

FIELD OF THE INVENTION

This invention relates to a motor vehicle mounted sensor system and, in particular, to one adapted to be mounted to the front end of a motor vehicle for detecting impacts including pedestrian-involved impacts like pedestrian and bicyclists impacts, and activating appropriate impact mitigation countermeasures.

BACKGROUND OF THE INVENTION

Motor vehicle collisions with pedestrians and bicyclists are a significant concern. While significant advancements have been made in protecting motor vehicle occupants from injury due to impacts, there remain significant opportunities to reduce injuries, particularly head injuries to pedestrians struck by motor vehicles. Various countermeasure systems have been devised for this purpose and are in use. Hood lifter mechanisms pop the engine compartment hood to an upward displaced position where it can absorb energy as a struck pedestrian hinges about their lower torso and strikes the hood area during an impact. The lifted hood provides energy absorption. Other measures such as external airbags have further been conceived and implemented. In this description, reference to pedestrian impacts is intended to include other types of impacts including those with bicyclists or animals and other low-energy (as compared with striking other vehicles or fixed objects) impacts.

For any deployable pedestrian impact countermeasure to be operative, some means of detecting the impact is required. Numerous systems are available for detecting such impacts. One approach uses an elongated flexible hollow tube which defines an enclosed volume of gas, typically air. Upon an impact, the soft fascia of the vehicle front end is deformed and the sensor tube is compressed, generating a gas pressure pulse in the tube which is transmitted to a pressure sensor, thereby detecting the impact. For these systems to be operative, a supporting structure behind the pressure based sensor is necessary. This structure enables the necessary compression to occur for generating the pressure pulse. Numerous other sensor technologies may be implemented which measure strain or compression exerted by deformation of the vehicle front end fascia. For example, other types of low energy impact sensing systems include switch arrays, peizo cable, fiber optic, etc. All such sensing techniques based on compression or deformation will be referred herein as compressive or compression sensors.

A particular design challenge is posed in extending the sensitive area of the vehicle front end to low energy impacts to include the outer corners or edges of the front end (referred in this description also as the boundaries of the front end). Typical passenger car and light truck vehicles feature rounded front end corners which create a glancing or oblique impact if the pedestrian strikes the vehicle in these areas. The glancing impact may not provide sufficient compression for a compression sensor to be operative as well as acting as part of the vehicle's high energy impact system. Moreover, typical vehicle front ends feature an energy absorbing cross beam in the front end needed for meeting low speed impact requirements. The structure of the energy absorbing beam may not extend laterally to these outer front corners. Accordingly, it is often the case that an underlying structure necessary for creating a reaction force to the impact resulting in compression of the sensing system in these outer corner areas is absent.

With the increasing demand for implementation of active pedestrian protection systems and improved frontal sensing capabilities, the packaging and detection capabilities are becoming more complex. Sensors required to detect events such as pedestrian impacts are packaged close to the front of the vehicle, and require accommodations for vehicle styling as well as bumper sensing area coverage. As compressive sensing technologies are introduced into the front end system of the vehicle, integration concepts to support the sensing technology are evolving. Body components such as fascia, energy absorber, and bumper beams are becoming key components in the impact energy transfer function.

Vehicle front end components are designed to meet damageability and injury criteria requirements, but generally do not consider requirements for pedestrian impact sensor integration or applications as a primary design objective. To meet the damageability and injury criteria requirements, the component suppliers incorporate a design balance of component stiffness versus compressibility. This balance can result in non-linear load transfer characteristics that make the integration of a compressive sensor technology complicated. It is critical that a compressive sensor assembly, in its installed condition in a motor vehicle structure, be properly tuned to respond to impacts of prescribed characteristics. Although it is possible to design compressive sensors having inherent sensitivity characteristics, such a sensor may not be adaptable for use over multiple vehicle product lines. In addition, it is often necessary to adjust the sensitivity and response of a compressive sensor along its extended length due to changes in the types of impact occurring at various areas of the vehicle and the characteristics of underlying and supporting structure.

In view of the aforementioned, there is a need in the art for improved pedestrian impact system which addresses the previously mentioned shortcomings in prior art systems. In particular, the need exists to enable flexibility in adjusting the sensitivity or tuning of a compressive sensor which is highly adaptable, and provides repeatable characteristics.

In any volume produced automotive application, cost concerns are significant. The increased sophistication and capabilities of motor vehicles must be provided in an efficient and low cost manner in order that the features become commercially viable. Accordingly, systems provided to meet the design objectives mentioned above need to be manufacturable and capable of being assembled in a cost effective manner.

SUMMARY OF THE INVENTION

In accordance with the present invention, a compressive sensor system is provided incorporating features for adjusting its response. In one embodiment, adjustability is provided by using a composite sensor system using energy absorbers coupled with the compressive sensor having different compressibility characteristics which are combined in a series arrangement with respect to acting on the compressive sensor element which, as a system, provides desired response characteristics. In another embodiment, a balanced compressive material is used for reacting against impact forces in a parallel force flow arrangement. Hybrid arrangements for providing combined parallel and series force flow relationships involving the various energy absorbing components are also contemplated and described with multiple energy absorbing materials combined in a manner to provide adjustability and response flexibility. A still further embodiment provides load transfer management in a sensor system by removing material from an energy absorbing component to provide desired response.

Additional benefits and advantages of the present invention will become apparent to those skilled in the art to which the present invention relates from the subsequent description of the preferred embodiment and the appended claims, taken in conjunction with the accompanying drawings.

DETAILED DESCRIPTION OF THE INVENTION

Figure 1:
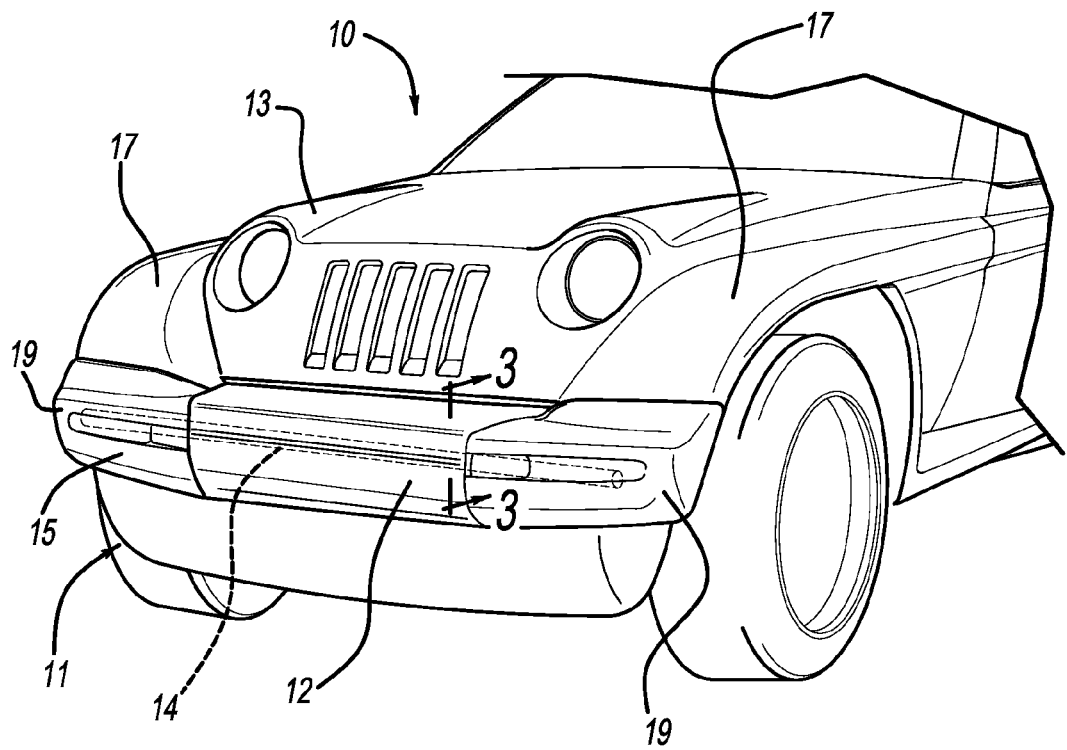
FIG. 1 is a front pictorial view of a motor vehicle incorporating a compressive sensor system in accordance with this invention.

With reference to FIG. 1, a representative motor vehicle 10 is shown with its front end 11 which includes front fascia 12, hood 13, and bumper 15, which joins front fenders 17 at front boundary (corner) areas 19. In the lower portion of front end 11, and typically behind front fascia 12 or bumper 15 is provided sensor assembly 14 in accordance with the present invention. Sensor assembly 14 is optimally placed behind a motor vehicle component at a position such that it that receives the best or first contact with a pedestrian during an impact and also high in terms of integration of the components. In the illustrated embodiment, sensor assembly 14 is mounted behind front fascia 12, but is shown in FIG. 1 in broken lines to show its positioning in an exemplary implementation.

Figure 2:
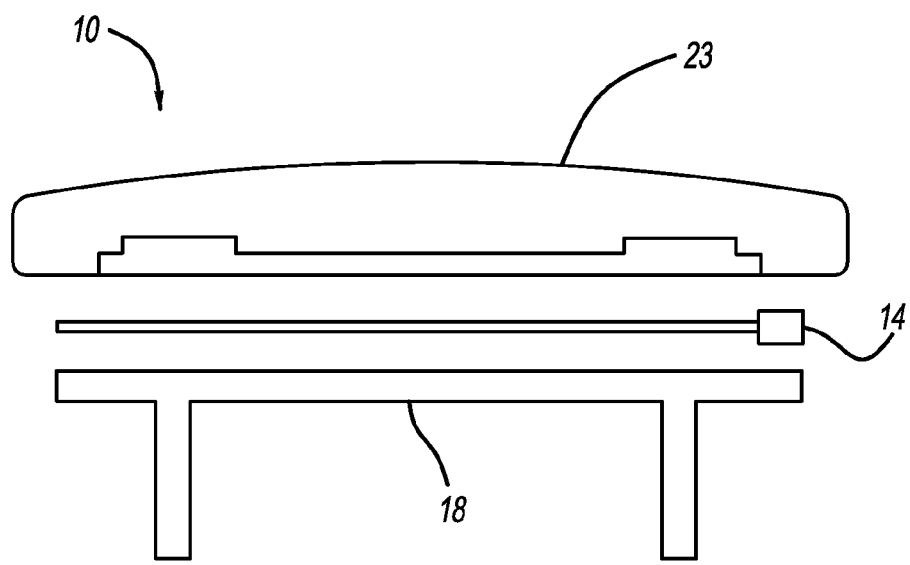
FIG. 2 is overhead schematic drawing of the a vehicle front and incorporating a compressive sensor in accordance with this invention.

FIG. 2 is an overhead view of the principal components of vehicle front end 11. As shown, cross body bumper beam 18 is shown with energy absorbing structure 23 with elongated compressive sensor assembly 14 sandwiched between the bumper beam and the energy absorbing structure. Front fascia 12 (not shown in FIG. 2) would cover the face of energy absorbing structure 23. Sensor assembly 14 may be of various types including a gas filled hollow tube coupled with a pressure sensing element, or may use various other technologies for measuring compression or deformation along its length, including but not limited to peizo arrays, switch arrays, peizo cable, fiber optic, or another type which provides a signal responsive to compression, stress, or strain and which extends laterally along a vehicle body region. Sensor assembly 14 may comprise one elongated element or may be provided in the form of a linear array of discrete compression sensitive elements extending laterally across the vehicle front end 11.

Figure 3:
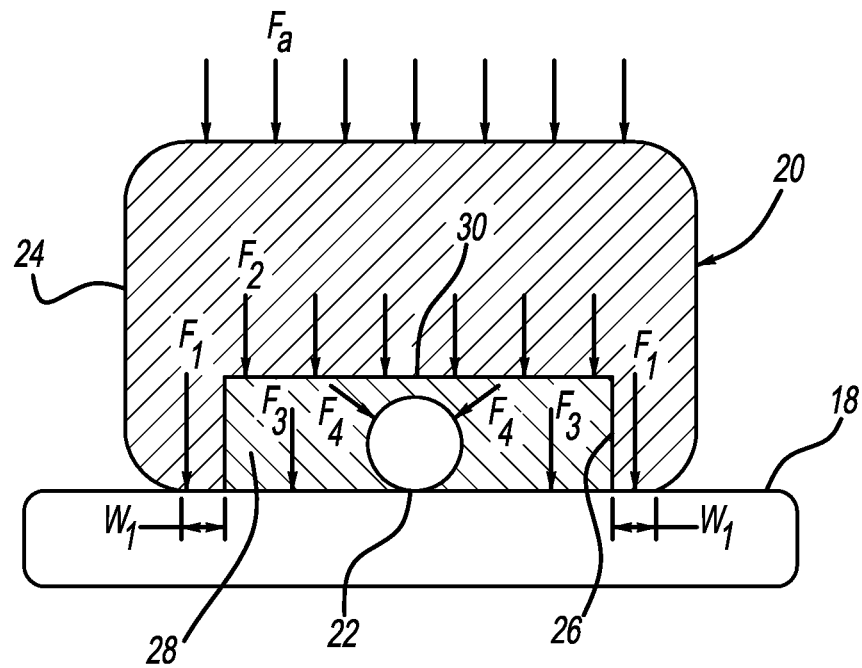
FIG. 3 is a cross-sectional view taken along line 3-3 of FIG. 1 through a sensor assembly in accordance with a first embodiment of the invention.

Now with reference to FIG. 3, a first embodiment of the present invention is illustrated as a balanced sensor assembly 20. As shown in the figure, assembly 20 is mounted in contact with or coupled to bumper beam 18. Sensor element 22, as mentioned previously, may be of various types. In one embodiment, sensor element 22 is a hollow gas filled tube. Energy absorber 24 is elongated and extends laterally across the vehicle front end 11 and may be formed of various materials such as open or closed cell foam which is highly compressible, semi-rigid, or rigid, and may have a variety of Durometer characteristics. Gel type materials may also be provided. As shown, energy absorber 24 forms a rectangular pocket 26 having balanced energy absorber 28 therein. While energy absorber 24 may be a generic component, balanced compressive energy absorber 28 may be provided in a range of different materials having compressive characteristics differing from that of energy absorber 24. A similar choice of materials is available for balanced compressive material 28. Compressive energy absorber 28 in addition to its static deformation characteristics, and may also have rate dependent characteristics.

In an impact condition in which deformation of energy absorber 24 occurs, compressive forces are transmitted to sensor element 22 through energy absorber 24 and balanced energy absorber 28 (which may be termed as first and second energy absorbers, respectively). In this way, energy absorbers 24 and 28 act in series in that compressive forces are transmitted through both elements before acting upon sensor element 22. For a given vehicle application, energy absorber 24 may be of a standardized design configuration for broad application whereas a variety of materials may be selected for balanced energy absorber 28 provided for the tuning function mentioned previously. In addition, the composition and characteristics of balanced energy absorber 28 may be varied along the lateral extent of sensor assembly 14. For example, a first material composition or characteristic may be provided for balanced energy absorber 28 in the center regions of the vehicle front end 11, with a different material composition used at or near corner areas 19. As mentioned previously, this may be due to the differing impact conditions encountered at these areas such as a glancing or oblique contact which occurs at the corner areas 19, or due to the differing structural characteristics of front fascia 12 or other integrated elements which affect transfer of impact forces to compressive sensor 14.

Energy absorber 24 may as mentioned previously be formed of an open cell type foam material and accordingly the foam acts primarily as a structural member subject to deformation of the material forming the open cells but does not primarily react in terms of compressing of trapped gases or air. In such an application, balanced energy absorber 28 could be formed of a closed cell foam material or could be formed of a foam material with an outer skin which is gas impermeable. In this way, compression of balanced energy absorber 28 is a function both of inherent material compression characteristics as well as gas pressure which develops due to its compression. Open cell type foam materials may also act partially to absorb energy by compressing gas while deforming partially enclosed cells of gas and as such can offer rate dependent compression characteristics.

In the embodiment shown in FIG. 3 the impact force is transmitted from the front surface 30 of energy absorber 24, which forces act upon sensor element 22. A uniformly applied impact force $F_a$ shown by the vector arrows in FIG. 3 is transmitted to bumper beam 18 along several force flow paths. Force flow path $F_1$ acts directly on bumper beam 18 with a flow path strictly through energy absorber 24 which exist at the outer boundaries of absorber pocket 26. Compressive forces $F_2$ act on the planar surface 30 interface between energy absorbers 24 and 28. Forces $F_2$ are in turn resolved, in part, into forces $F_3$ which couple directly to bumper beam 18. Compressive forces $F_4$ act on sensor element 22 to compress it, which in turn activates a sensor for the detection of the vehicle impact. In the design of the system, the manner of the application of applied force $F_a$ as it is resolved into compressive forces $F_4$ acting on sensor element 22 can be adjusted through the selection of the materials forming energy absorbers 24 and 28. As is evident in FIG. 3, the design of balanced sensor assembly 20 provides numerous opportunities for precise tuning of impact sensing response. In addition to the selection of materials of energy absorber 24 and balanced energy absorber 28, the size and shape of absorber pocket 26 can be adjusted as well as the extent to which energy absorber 24 overlaps pocket 26 at its edges for the direct coupling of forces $F_a$ to result in force $F_1$ acting on bumper beam 18. In other words, the contact width $W_1$ of the legs 27 of energy absorber 24 which bear directly on bumper beam 18 can be adjusted to control the proportion of the applied force $F_A$ which, to a degree, bypasses acting on balanced energy absorber 28 and consequently sensor element 22.

Figure 4:
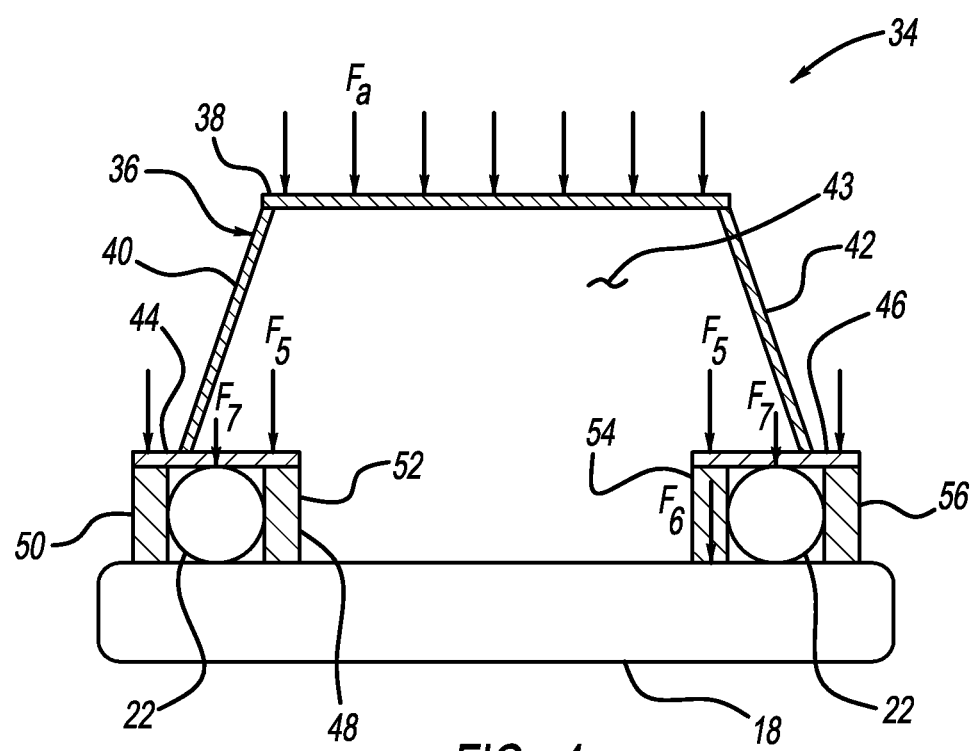
FIG. 4 is a cross-sectional view through a sensor assembly in accordance with a second embodiment of this invention.

Now with reference to FIG. 4, a second embodiment of balanced sensor system 34 is illustrated. In this case, first energy absorber 36 is formed of a rigid thin-walled structure having front surface 38, side walls 40 and 42, with pads 44 and 46, respectively. Below each of the pads 44 and 46 is mounted a compressive sensor element 22, with the sensor elements supported at their sides by balanced energy absorber 48 in the form of columns or walls. The arrangement of FIG. 4 is a cross-section taken in the same direction as that of FIG. 3 and as such, one of sensor elements 22 shown in FIG. 4 is positioned above the other (with respect to the ground and its installed position in the vehicle). Balanced energy absorber 48 is formed into four strips 50, 52, 54, and 56.

With continued reference to FIG. 4, an applied force $F_a$ acting on the front surface 38 of first energy absorber 36 is transmitted through side walls 40 and 42 to pads 44 and 46. First energy absorber 36 would preferably be designed to be compressible to reduce the duration and peak forces applied to pads 44 and 46 and distribute localized applied forces over a larger area. Force $F_5$ acts on the assembly of the sensor elements 22 and their associated strips 50, 52, 54, and 56. In this application, forces $F_6$ acting through strips 50-56 do not act directly on sensor element 22 but instead reduce the force $F_7$ acting on the sensor element 22. In this way the material and dimensional characteristics of material strips 50-56 forming the balanced energy absorber 48 including their heights and widths can be selected to provide desired compressive sensor response characteristics.

In an alternate variation of sensor system 34, the hollow cavity 43 of first energy absorber 36 may be filled with another material such as a foam-like material, or a honeycomb type structure as a means of controlling its impact response and as part of a design in tuning the response of the system.

Figure 5:
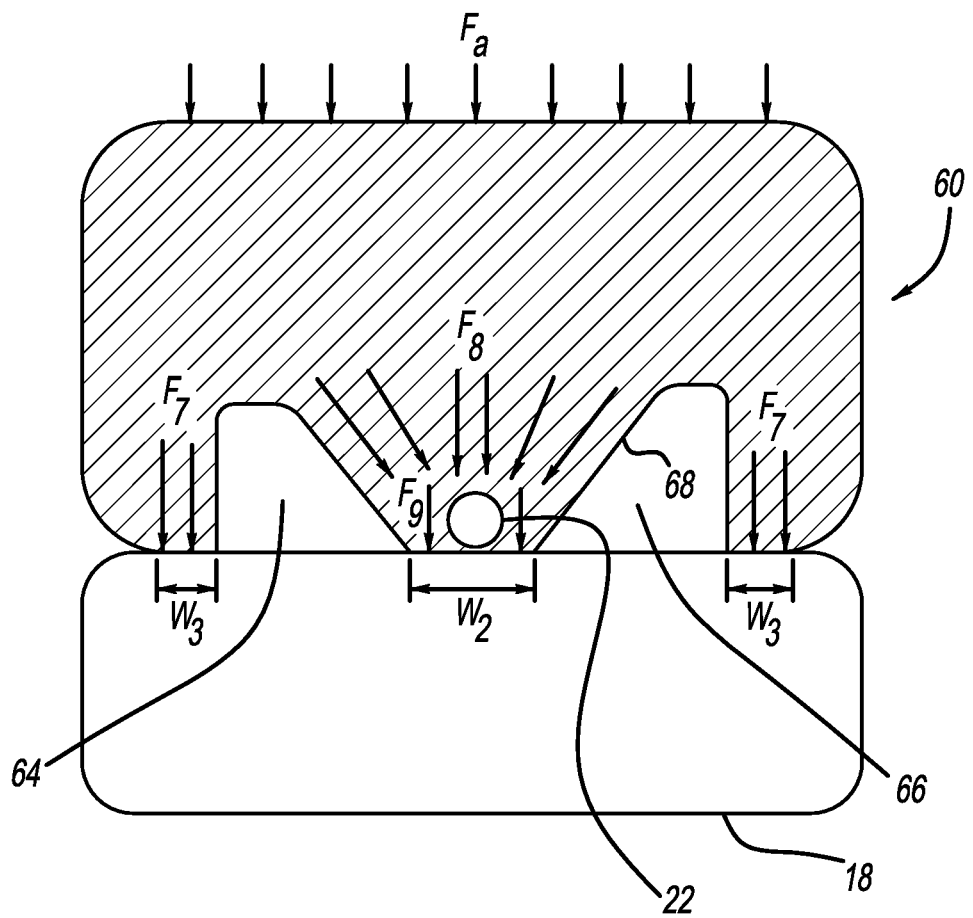
FIG. 5 is a cross-sectional view through a sensor assembly in accordance with a third embodiment of this invention.

Now with reference to FIG. 5, a third embodiment of a balance compressive sensor 60 in accordance with this invention is illustrated. In this case, the tuning characteristics of force transfer from an applied impact force to forces acting on sensor element 22 are managed by the removal of material from energy absorber 62 (or by shaping it in a desired manner during its production). Energy absorber 62 is similar in external configuration to energy absorber 24 shown in FIG. 3. However, energy absorber 62 adjusts force transfer to sensor element 22 through the absence of material in its cross-section. For example, as illustrated in FIG. 5, energy absorber 62 forms a pair of generally trapezium shaped cutouts areas 64 and 66, leaving a trapezoid shaped central leg or rib 68. Areas 64 and 66 may be left as voids or they may be filled with a second energy absorber material for force balancing. For balanced compressive sensor 60, the applied force $F_A$ is resolved into force $F_1$ which, as in the first embodiment, is coupled directly into bumper beam 18, and forces $F_8$ which are focused toward and interact with sensor element 22. Due to the width $W_2$ of the central rib 68, some components of the force $F_8$ act directly against bumper beam 18, designated by force vectors $F_9$. Accordingly, one approach toward tuning the response of energy absorber 62 is to adjust the widths $W_3$ of the outer legs of the energy absorber, and width $W_2$ of the central leg. These variations affect the force transfer acting on sensor element 22. As is evident from FIG. 5, the response of the system may be tuned by the configuration and material forming energy absorber 62 as well as the configuration shape and size of cutout areas 64 and 66. The configuration of energy absorber 62 provides a force concentration feature, evident from the converging directions of force vectors $F_8$ shown in FIG. 5, which may enhance the sensitivity of sensor element 22 to low-energy frontal impact. Since the impact characteristics and response may vary for a sensor extending across the vehicle front end 11, it may be desirable to change the configuration of cutout areas 64 and 66 as a function of lateral position along the vehicle front end.

While the above description constitutes the preferred embodiment of the present invention, it will be appreciated that the invention is susceptible to modification, variation, and change without departing from the proper scope and fair meaning of the accompanying claims.

What is claimed is:

1. A low-energy impact sensor assembly for mounting to the front end of a motor vehicle and behind a front fascia for detecting a low energy impact for deploying an impact countermeasure, comprising;
   a first energy absorber formed of a material having a first compressive characteristic,
   a second energy absorber formed by a material having a second compressive characteristic differing from the first compressive characteristic, and
   a compressive sensor element coupled to a vehicle structural element of the vehicle in a manner that force resulting from the low-energy impact acts on the compressive sensor element in and is influenced by both the first and the second energy absorbing materials, the compressive sensor element being encased by at least one energy absorber out of the first energy absorber and second energy absorber, the at least one energy absorber being shaped to be in direct contact with a front surface the vehicle structural element above and below the compressive sensor element.

2. The low-energy impact sensor assembly according to claim 1 further comprising the vehicle structural element in the form of a cross body bumper beam with the sensor assembly positioned between the fascia and the beam.

3. The low-energy impact sensor assembly according to claim 1, wherein the low-energy impact results in deformation of the front fascia and the first and second energy absorbers.

4. The low-energy impact sensor assembly according to claim 1 further comprising the compressive sensor element formed of a hollow elongated gas filled tube extending laterally across the vehicle front end.

5. The low-energy impact sensor assembly according to claim 1 further comprising the first energy absorber formed of a polymeric material which is one of a closed cell foam, an open cell foam, or a gel.

6. The low-energy impact sensor assembly according to claim 5 further comprising the first energy absorber covered by a gas impermeable skin.

7. The low-energy impact sensor assembly according to claim 1 further comprising, the second energy absorber formed of a polymeric material which is one of closed cell foam, an open cell foam, or a gel.

8. The low-energy impact sensor assembly according to claim 7 further comprising the second energy absorber covered by a gas impermeable skin.

9. A low-energy impact sensor assembly according to claim 1 further comprising, the first energy absorber in the form of a structural element having at least one portion engaging the second energy absorber and the compressive sensor element.

10. A low-energy impact sensor assembly according to claim 9 further comprising, the at least one portion acts on the compressive sensor element and on at least one column forming the second energy absorber.

11. A low-energy impact sensor assembly according to claim 10 further comprising, the first energy absorber having two portions each engaged with a first and a second of the compressive sensor element and at least one column forming the second energy absorber.

12. A low-energy impact sensor assembly according to claim 11 further comprising, a pair of the second energy absorber columns embracing each of the first and second compressive sensor elements.

13. A low-energy impact sensor assembly for mounting to the front end of a motor vehicle and behind a front fascia for detecting a low energy impact for deploying an impact countermeasure, comprising;
 a first energy absorber formed of a material having a first compressive characteristic,
 a second energy absorber formed by a material having a second compressive characteristic differing from the first compressive characteristic, and
 a compressive sensor element coupled to a vehicle structural element of the vehicle in a manner that force resulting from the low-energy impact acts on the compressive sensor element in and is influenced by both the first and the second energy absorbing materials, the first energy absorber forming a pocket with the second energy absorber positioned within the pocket and both the first and the second energy absorbers encasing the compressive element.

14. The low-energy impact sensor assembly according to claim 13 wherein the compressive sensor element is embedded within the second energy absorber.

15. The low-energy impact sensor assembly according to claim 13 further comprising the first energy absorber having portions forming sides of the pocket and extending to contact the vehicle structural element and the second energy absorber having a surface contacting the vehicle structural element.

16. The low-energy impact sensor assembly according to claim 13 further comprising the second energy absorber encasing the compressive sensor element.

17. The low-energy impact sensor according to claim 13 further comprising the first energy absorber configured to cause an applied force acting on a surface of the first energy absorber acting through a first force flow path directly coupled with the vehicle structural element and through a second force flow path resulting in compressive forces acting on the second energy absorber and the compressive sensor element.

18. A low-energy impact sensor assembly for mounting to the front end of a motor vehicle and behind a front fascia for detecting a low energy impact for deploying an impact countermeasure, comprising;
 an energy absorber formed of a material having a compressive characteristic, the energy absorber having a first portion contacting a vehicle structural element and forming at least one pocket extending laterally across the vehicle front end adjacent the vehicle structural element, wherein the pocket focuses compressive forces acting on the energy absorber to act on a compressive sensor element, the compressive sensor element coupled to the vehicle structural element of the vehicle and encased by the energy absorber in a manner that force resulting from the low-energy impact acts on the compressive sensor element in a manner influenced by the configuration of the at least one pocket and the energy absorber being in contact with a front surface of the vehicle structural element above and below the compressive sensor element.

19. A low-energy impact sensor assembly according to claim 18 further comprising the energy absorber forming a pair of the pockets.

20. A low-energy impact sensor assembly according to claim 18 wherein the at least one pocket is filled with an energy absorbing material differing from the material forming the energy absorber.

21. A low-energy impact sensor assembly according to claim 19 comprising the pockets and having a cross-sectional trapezium configuration.

22. A low-energy impact sensor assembly according to claim 19 wherein the pockets form a central rib, the central rib defining two force flow paths for a force applied to the energy absorber including a first force flow path coupling directly into the vehicle structural element and a second flow path compressing the compressive sensor element.

23. A low-energy impact sensor assembly according to claim 19 wherein the pockets define a central leg having a generally trapezoid shaped cross section having a narrow end in engagement with the vehicle structural element.

* * * * *